US012673819B2

(12) United States Patent
Holzhäuser

(10) Patent No.: US 12,673,819 B2
(45) Date of Patent: Jul. 7, 2026

(54) METHOD FOR OPERATING A PICKING DEVICE FOR MEDICAMENTS AND A PICKING DEVICE FOR CARRYING OUT SAID METHOD

(71) Applicant: Becton Dickinson Rowa Germany GmbH, Kelberg (DE)

(72) Inventor: Dennis Holzhäuser, Mendig (DE)

(73) Assignee: BECTON DICKINSON ROWA GERMANY GMBH, Kelberg (DE)

( * ) Notice: Subject to any disclaimer, the term of this patent is extended or adjusted under 35 U.S.C. 154(b) by 184 days.

(21) Appl. No.: 18/402,951

(22) Filed: Jan. 3, 2024

(65) Prior Publication Data

US 2024/0132284 A1      Apr. 25, 2024

Related U.S. Application Data

(63) Continuation of application No. 17/672,460, filed on Feb. 15, 2022, now Pat. No. 11,919,712, which is a
(Continued)

(51) Int. Cl.
*G06F 7/00*         (2006.01)
*B65G 1/04*         (2006.01)
(Continued)

(52) U.S. Cl.
CPC ......... *B65G 1/0492* (2013.01); *B65G 1/1373* (2013.01); *G05D 1/0214* (2013.01);
(Continued)

(58) Field of Classification Search
CPC .......... B65G 1/1373; B65G 2203/0208; B65G 1/1378; B65G 1/00; B65G 1/023–026;
(Continued)

(56) References Cited

U.S. PATENT DOCUMENTS 6,477,442 B1    11/2002  Valerino
7,693,757 B2     4/2010  Zimmerman
(Continued)

FOREIGN PATENT DOCUMENTS

CN       108025870 A     5/2018
CN       109753070 A     5/2019
(Continued)

OTHER PUBLICATIONS

Extended European Search Report for Application No. 20151151.6, dated Jul. 17, 2020, 14 pages.
(Continued)

*Primary Examiner* — Yolanda R Cumbess
(74) *Attorney, Agent, or Firm* — MASCHOFF BRENNAN

(57)         ABSTRACT

A system having a picking device for medicaments are provided. The system including a picking device that includes a movement space, an optical detection device and a control device. The system also includes a memory and a processor configured to create an image of the movement space, compare predefined areas of the image of the movement space with corresponding areas of a reference image, determine that an obstacle is present in a detected portion of the movement space based on the image comparison and provide corresponding signals for responding to the obstacle. A machine-readable medium for operating picking devices for medicaments is also provided.

14 Claims, 5 Drawing Sheets

Related U.S. Application Data continuation of application No. 16/739,884, filed on Jan. 10, 2020, now Pat. No. 11,286,111.

(51) Int. Cl.

| | |
|---|---|
| *B65G 1/137* | (2006.01) |
| *G05D 1/00* | (2006.01) |
| *G05D 1/617* | (2024.01) |
| *G05D 1/628* | (2024.01) |
| *G06T 7/73* | (2017.01) |

(52) U.S. Cl.
CPC ........... *G05D 1/0238* (2013.01); *G05D 1/617* (2024.01); *G05D 1/628* (2024.01); *G06T 7/74* (2017.01); *B65G 2203/0208* (2013.01)

(58) Field of Classification Search
CPC ....... B65G 1/0407–0435; B65G 1/0457–0471; B65G 1/0485–0492; B65G 1/06–065; B65G 1/10; B65G 1/12; B65G 1/137–1375; B65G 2203/00; B65G 2203/02; B65G 2203/04; B65G 2203/041–042; B65G 1/04; B65G 1/0414; B65G 1/0421; B65G 1/0428; B65G 1/1376; G05D 1/0214; G05D 1/0238; G05D 1/617; G05D 1/628; G05D 1/633–637; G05D 1/639; G05D 1/622; G05D 1/642; G06T 7/74; G06T 2207/30261; G06T 7/0008; G06T 7/001; G06T 7/70
USPC .................................................. 700/213–214
See application file for complete search history.

(56) References Cited

U.S. PATENT DOCUMENTS

| | | | |
|---|---|---|---|
| 9,466,046 B1 | 10/2016 | Theobald | |
| 9,978,036 B1 | 5/2018 | Eller | |
| 11,164,226 B2 * | 11/2021 | Gu | ........................... B65G 1/04 |

| | | | |
|---|---|---|---|
| 2008/0272138 A1 | 11/2008 | Ross et al. | |
| 2019/0102965 A1 | 4/2019 | Greyshock et al. | |
| 2019/0243358 A1 * | 8/2019 | Jaquez | ................. G05D 1/0282 |
| 2020/0338744 A1 * | 10/2020 | Wang | ................... G05D 1/0238 |
| 2020/0400818 A1 * | 12/2020 | Horesh | ................... G06T 7/521 |
| 2021/0008721 A1 * | 1/2021 | Voorhies | ............... G06Q 10/08 |
| 2021/0032034 A1 | 2/2021 | Kalouche | |
| 2021/0133835 A1 * | 5/2021 | Gu | ........................ G06Q 10/08 |
| 2021/0188554 A1 | 6/2021 | Kalouche et al. | |

FOREIGN PATENT DOCUMENTS

| | | | |
|---|---|---|---|
| CN | 110609546 | A | 12/2019 |
| CN | 110622085 | A | 12/2019 |
| DE | 10225332 | A1 | 1/2004 |
| DE | 102004001198 | A1 | 8/2005 |
| DE | 102014111394 | A1 | 2/2016 |
| DE | 102015118832 | B3 | 1/2017 |
| EP | 3530601 | A1 | 8/2019 |
| JP | H09142617 | A | 6/1997 |
| JP | 2004182451 | A | 7/2004 |
| JP | 2009155056 | A | 7/2009 |
| JP | 2009227366 | A | 10/2009 |
| JP | 2017048052 | A | 3/2017 |
| JP | 2018512526 | A | 5/2018 |
| JP | 2018122963 | A | 8/2018 |
| JP | 2019511437 | A | 4/2019 |
| JP | 2019527172 | A | 9/2019 |
| KR | 1020180050674 | A | 5/2018 |
| WO | WO-2018066236 | A1 | 4/2018 |
| WO | WO-2019183141 | A1 | 9/2019 |

OTHER PUBLICATIONS

European Office Action for Application No. 20151151.6, dated Jun. 29, 2023, 10 pages including translation.

Chinese Office Action for Application No. 202080092262.9, dated Jan. 27, 2025, 13 pages including translation.

Japanese Office Action for Application No. 2022-536915, dated Dec. 17, 2024, 14 pages including translation.

Korean Office Action for Application No. 10-2022-7019267, dated Jul. 8, 2025, 18 pages including translation.

* cited by examiner

METHOD FOR OPERATING A PICKING DEVICE FOR MEDICAMENTS AND A PICKING DEVICE FOR CARRYING OUT SAID METHOD

CROSS-REFERENCE TO RELATED APPLICATIONS

This application is a continuation of U.S. patent application Ser. No. 17/672,460, entitled "METHOD FOR OPER-ATING A PICKING DEVICE FOR MEDICAMENTS AND A PICKING DEVICE FOR CARRYING OUT SAID METHOD," filed on Feb. 15, 2022, issued as U.S. Pat. No. 11,919,712 on Mar. 5, 2024, which is a continuation of U.S. patent application Ser. No. 16/739,884, entitled "METHOD FOR OPERATING A PICKING DEVICE FOR MEDICA-MENTS AND A PICKING DEVICE FOR CARRYING OUT SAID METHOD," filed on Jan. 10, 2020, issued as U.S. Pat. No. 11,286,111 on Mar. 29, 2022, the entire content of which is incorporated by referenced herein.

BACKGROUND

The present disclosure relates to a method for operating a picking device for medicaments and a picking device, which can be operated according to the method of the disclosure.

In typical picking devices for medicaments, at least one operating device is regularly installed, the gripper thereof being movable on corresponding guides in the longitudinal axis (X-direction or X-axis) and in the height axis (Z-direc-tion or Z-axis) such that different shelves in the picking device, as well as a storage device and an unloading device, can be reached. Such picking devices for medicaments typically operate largely automatically, in other words, it is only necessary to enter the interior of the picking device if, for example, cleaning of parts within the picking device is necessary or a malfunction requires the intervention of an operator, for example, if a storage or removal of a medica-ment package could not be done properly. During every intervention by an operator, it is possible that an object is left behind unintentionally in the picking device, such as a ladder for reaching higher portions of the picking device. Depending on the size and positioning of this object which was left behind unintentionally, this can represent an obstacle to the operating device. In extreme cases, a normal movement of the operating device can lead to a collision with the object that was left behind, possibly resulting in damage to the operating device. A collision may also result in medicament packages being misplaced on one or more storage areas such that manual removal is necessary. Depending on the obstacle and the collision, it is also possible that an obstacle tipping over due to the collision completely destroys several shelf surfaces. In any case, a collision between the operating device and an obstacle left behind in the picking device causes an intervention by an operator, which in turn leads to downtime of the picking device.

SUMMARY

One or more embodiments provide a system having a picking device for medicaments. The system includes a picking device having a movement space, an optical detec-tion device and a control device. The system also includes a memory storing instructions and at least one processor configured to execute the instructions to create an image of the movement space, compare predefined areas of the image of the movement space with corresponding areas of a reference image, determine that an obstacle is present in a detected portion of the movement space based on the image comparison and provide corresponding signals for respond-ing to the obstacle.

One or more embodiments provide a non-transitory machine-readable storage medium comprising instructions thereon that, when executed by a machine, causes the machine to perform operations comprising creating an image of a movement space within a picking device, com-paring predefined areas of the image of the movement space with corresponding areas of a reference image, determining that an obstacle is present in a detected portion of the movement space based on the image comparison and pro-viding corresponding signals for responding to the obstacle.

The foregoing and other features, aspects and advantages of the disclosed embodiments will become more apparent from the following detailed description and accompanying drawings.

BRIEF DESCRIPTION OF DRAWINGS

Embodiments of the device according to the disclosure and of the method according to the disclosure is described below with reference to the drawings, in which:

FIGS. 6a and 6b are schematic illustrations of the move-ment space of the picking device of FIGS. 1a and 1b in which obstacles are arranged at different positions;

FIGS. 7a-7d are schematic illustrations of a comparison between an overall image and a reference overall image of FIG. 6a.

DETAILED DESCRIPTION

Figure 1B:
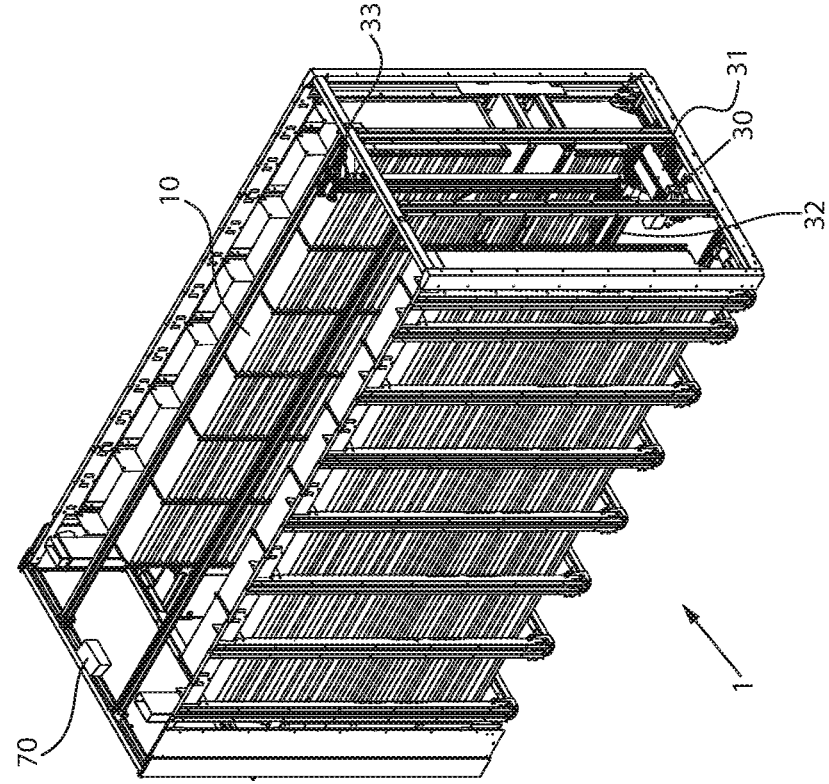
FIGS. 1a and 1b are perspective views of one or more embodiments of a picking device according to the disclo-sure.

The detailed description set forth below describes various configurations of the subject technology and is not intended to represent the only configurations in which the subject technology may be practiced. The detailed description includes specific details for the purpose of providing a thorough understanding of the subject technology. Accord-ingly, dimensions are provided in regard to certain aspects as non-limiting examples. However, it will be apparent to those skilled in the art that the subject technology may be prac-ticed without these specific details. In some instances, well-known structures and components are shown in block diagram form in order to avoid obscuring the concepts of the subject technology.

It is to be understood that the present disclosure includes examples of the subject technology and does not limit the scope of the appended claims. Various aspects of the subject technology will now be disclosed according to particular but non-limiting examples. Various embodiments described in the present disclosure may be carried out in different ways and variations, and in accordance with a desired application or implementation.

One or more embodiments of the disclosure provide a method for operating a picking device, in which downtimes due to collisions of the operating device with obstacles are avoided. The picking device used to carry out the method may include a plurality of storage spaces for medicament bottles and/or packages, an operating device having a gripper, the operating device being movable horizontally in an X-direction or X-axis and vertically in a Z-direction or Z-axis in a movement space in front of the storage spaces, at least one storage device with which medicament bottles and/or packages can be moved into the picking device and from which the gripper can take medicament bottles and/or packages, at least one identification device for identifying medicament bottles and/or packages, an unloading device, to which medicament bottles and/or packages can be transferred by the operating device for removal from the picking device, and a control device coupled to the operating device and the identification device. In addition, the picking device may include an optical detection device coupled to the control device, which is arranged in the picking device such that it can create an image of the movement space.

In the method according to the disclosure, in a step a), after a predetermined event, which may be, for example, a routine cleaning of the interior of the picking device, an image of the portion of the movement space detectable by the optical detection device is created with the at least one optical detection device. Whether this image covers the entire movement space depends, amongst others, on the exact placement of the optical detection device as well as the size of the movement space. If the optical detection device is arranged, for example, on an end face of the picking device and the extent along the X-axis is not too great, it is conceivable that the entire movement space can be captured with an optical detection device in one image. However, it is also conceivable that the optical detection device is arranged in or on, for example, the gripper of the operating device. In such a case, whether one image is sufficient, depends, among other things, on the positioning of the operating device within the picking device. For example, if the operating device is located in the center of the picking device with respect to the X-axis, it may be necessary to capture an image "left" and an image "right" from the operating device. In such a case, it is also conceivable for very long picking devices that several images must be created until the entire range of movement is checked. For this purpose, the operating device is only moved in the X-direction as far as the movement space was detected and recognized as free.

In a subsequent method step b), predefined areas of the image of the movement space are compared with corresponding areas of a reference image. The "predefined areas" may be the complete captured image. However, since the image of the movement space inevitably also includes areas which are irrelevant for a subsequent evaluation (areas of the storage spaces for medicament bottles and/or packages), it is also conceivable that only partial areas of the image of the movement space are compared with corresponding partial areas of the reference image.

In a method step c), it is determined on the basis of the comparison of the predetermined areas of the image and the reference image whether an obstacle is present in the detected section of the movement space. How exactly the determination of an obstacle is performed is not relevant to the present disclosure; it is only substantial that it is determined on the basis of the comparison whether an obstacle is present which could possibly prevent a movement of the operating device. There are various methods known to the person skilled in the art, one of which is described further below.

In a method step d), corresponding signals are provided based on the determination of the presence of an obstacle in the detected portion of the movement space. In a simplest case, these signals cause a movement of the operating device to be inhibited, regardless of the positioning and size of the obstacle. Moreover, it is conceivable that in such a case, an operator is informed of the presence of an obstacle, which can be carried out, for example, optically by means of a display device or acoustically.

In one or more embodiments of the method according to the disclosure, the movement of the operating device is simply blocked upon detection of an obstacle. In one or more embodiments of the method according to the disclosure, the position and the size of an obstacle in the detected portion of the movement space is determined in method step d) after carrying out the comparison of predetermined areas of the image and the reference image. The knowledge of this information makes it possible to estimate whether blocking the movement of the operating device is even necessary. Depending on the processing algorithms of the image analysis software used, it may be necessary to attach a few reference points in the picking device, by which size and position can be determined.

Based on the aforementioned information, it may be determined based on the determined position and size of the obstacle, whether the operating device can drive around the obstacle. If this is the case, the user can be given the choice to remove an obstacle immediately or to do so at a later time and continue to operate the picking device despite the obstacle. The operating device is then of course controlled in such a way that it drives around the existing obstacle and a collision is avoided.

The obstacle may be positioned and/or formed such that no storage area of the picking device is affected, that is, that all medicament bottles and/or packages can be accessed despite the existing obstacle. For example, it is conceivable that the obstacle blocks only a portion of the unloading device, which possibly prevents storage of medicament bottles and/or packages, but not a removal. In such a case, it is conceivable that the picking device continues to operate in the opening hours of a pharmacy and that the obstacle is removed immediately after the regular opening hours. In one or more embodiments, it is provided that, when an obstacle can be moved around, the area blocked by an obstacle is marked as not accessible or not to be driven. This is particularly useful if medicament packages are stored in this area. When knowing which storage areas cannot be reached in the picking device due to the obstacle, it can be determined immediately in the presence of a removal request, if an otherwise removable medicament package cannot be removed due to the obstacle.

If an obstacle is detected, it must be removed immediately or, where applicable, later by a user. However, this only applies in the event that the obstacle cannot be moved out of the way, for example, by the operating device itself. In one or more embodiments of the method according to the disclosure, it is therefore provided that it is determined on the basis of the determined position and size of the obstacle whether an obstacle can be moved with the operating device. If this is the case, an attempt can be made to grab the obstacle with the gripper of the operating device and place it at a predetermined location, which may be, for example, the unloading device. So it is conceivable, for example, that if only an obstacle of small size is positioned on, for example, the X-guide of the operating device, said obstacle is removed with the gripper and without the intervention of an operator.

In order to determine whether an obstacle is present in the movement space within the picking device, a comparison of predetermined areas of the image and the reference image is performed. In order to avoid that the gripper of the operating device covers up a possibly present obstacle when taking the image, it is provided in one or more embodiments of the method that the gripper of the operating device is moved into a maximum Z-position along the Z-axis before creating the image.

Depending on the extent of the picking device in the longitudinal direction, in other words, along the X-axis, it may be sufficient that only one optical detection device is used. However, in picking devices that exceed a certain extent in the X-direction, it may be necessary to use multiple optical detection devices. In such a case, it may be preferable that the image and the reference image are composed of a plurality of single images, and that the obstacle is detected on the basis of the composite images. It is conceivable that a comparison of the image and the reference image is performed on the basis of partial images. If the optical detection device is arranged or realized in or on the gripper, for example by a 2D or 3D camera, it may be necessary to repeat the method multiple times, wherein with each repetition a portion of the movement space is recorded or examined. In other words, the method according to the disclosure may be carried out per portion.

One or more embodiments of a picking device according to the disclosure may include a plurality of storage spaces for medicament bottles and/or packages, wherein the storage spaces depending on the medicaments to be stored (package or bottle) can be provided by horizontal shelves, possibly having receptacles for bottles. The picking device further includes an operating device having a gripper, the operating device being movable horizontally in an X-direction (X-axis) and vertically in a Z-direction (Z-axis) in a movement space in front of the storage spaces, at least one storage device, with which medicament bottles and/or packages can be moved into the picking device and from which the gripper can remove medicament bottles and/or packages, at least one identification device for identifying medicament bottles and/or packages, an unloading device to which medicament bottles and/or packages from the operating device can be handed over for removal and at least one optical detection device which is arranged in the picking device such that said optical detection device can create an overall image of the movement space, as well as a control device coupled to the operating device, the identification device and the optical detection device, the control device configured to carry out the method steps of the method according to the disclosure described above.

In one or more embodiments of the picking device, it is provided that the optical detection device is a component of the gripper of the operating device. Therefore, a component is used, which usually every gripper includes in order to realize the method according to the disclosure. The additional costs for the implementation of the method are limited in this case to necessary adjustments of the software, since no new components are to be integrated into an existing picking device.

Figure 1A:
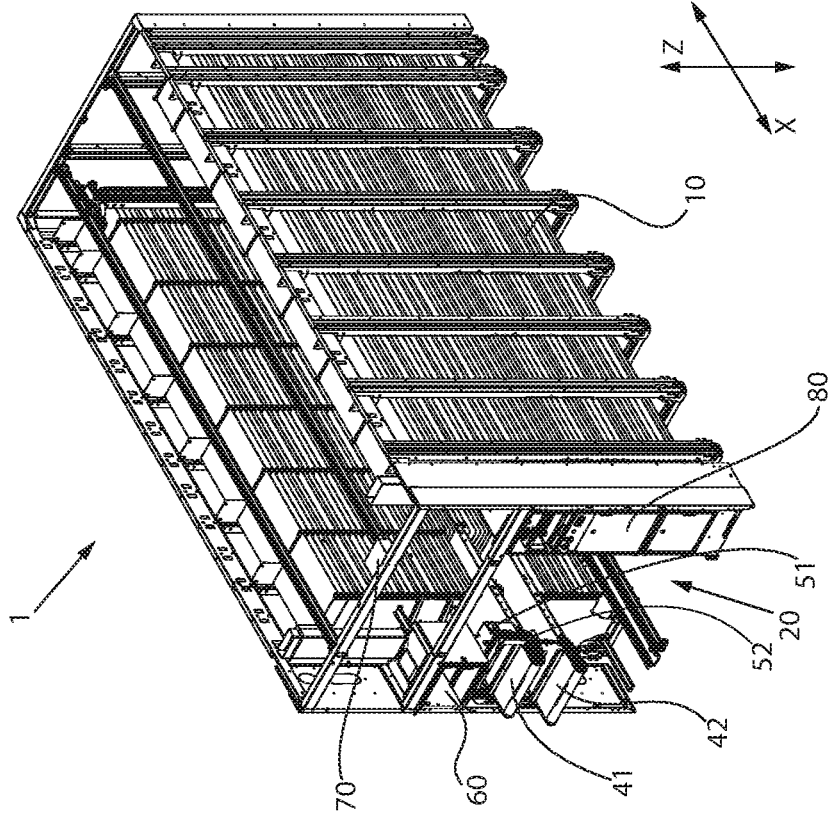

FIGS. 1a and 1b show oblique views of an embodiment of a picking device 1 for medicament packages according to the disclosure, wherein in the embodiment shown, the outer housing is omitted. In the embodiment shown, the picking device 1 includes a plurality of shelves 10, which form two parallel rows of shelves, between which a movement space 20 is formed, in which operating device 30 having a gripper 31 can be moved horizontally in an X-direction and vertically in a Z-direction. For this purpose, the picking device 1 includes a horizontal or X-guide 32 and a vertical or Z-guide 33. The picking device 1 further includes two storage devices 41, 42, which are formed in the embodiment shown as conveyor belts. In the storage front side shown in FIG. 1a, these storage devices 41, 42 extend with a portion beyond the actual storage end face of the picking device 1, and in these portions an operator can place medicament packages to be stored. Above each storage device 41, 42, an identification device 51, 52 is arranged in the storage end area of the picking device 1 with which the medicament packages to be stored are identified and, if necessary, measured. \

The picking device 1 further includes an unloading device 60, to which the gripper 31 of the operating device 30 can transfer medicament packages. The operating device 30 and the identification devices 51, 52 are coupled to a control device 80, which in the embodiment shown is also arranged in the storage end area (see FIG. 1a). According to the disclosure, the picking device 1 may have an optical detection device 70, which is arranged in the picking device 1 such that it can create an overall image of the movement space 20. In the embodiment shown, the optical detection device 70 is also arranged at the storage end side. The optical detection device can also be arranged in the rear end side shown in FIG. 1b or centrally above the movement space 20, for example, wherein the ideal arrangement of the optical detection device 70 depends on the type of detection device used (e.g., camera, sensor) and the design of the movement space 20.

Figures 2, 3:
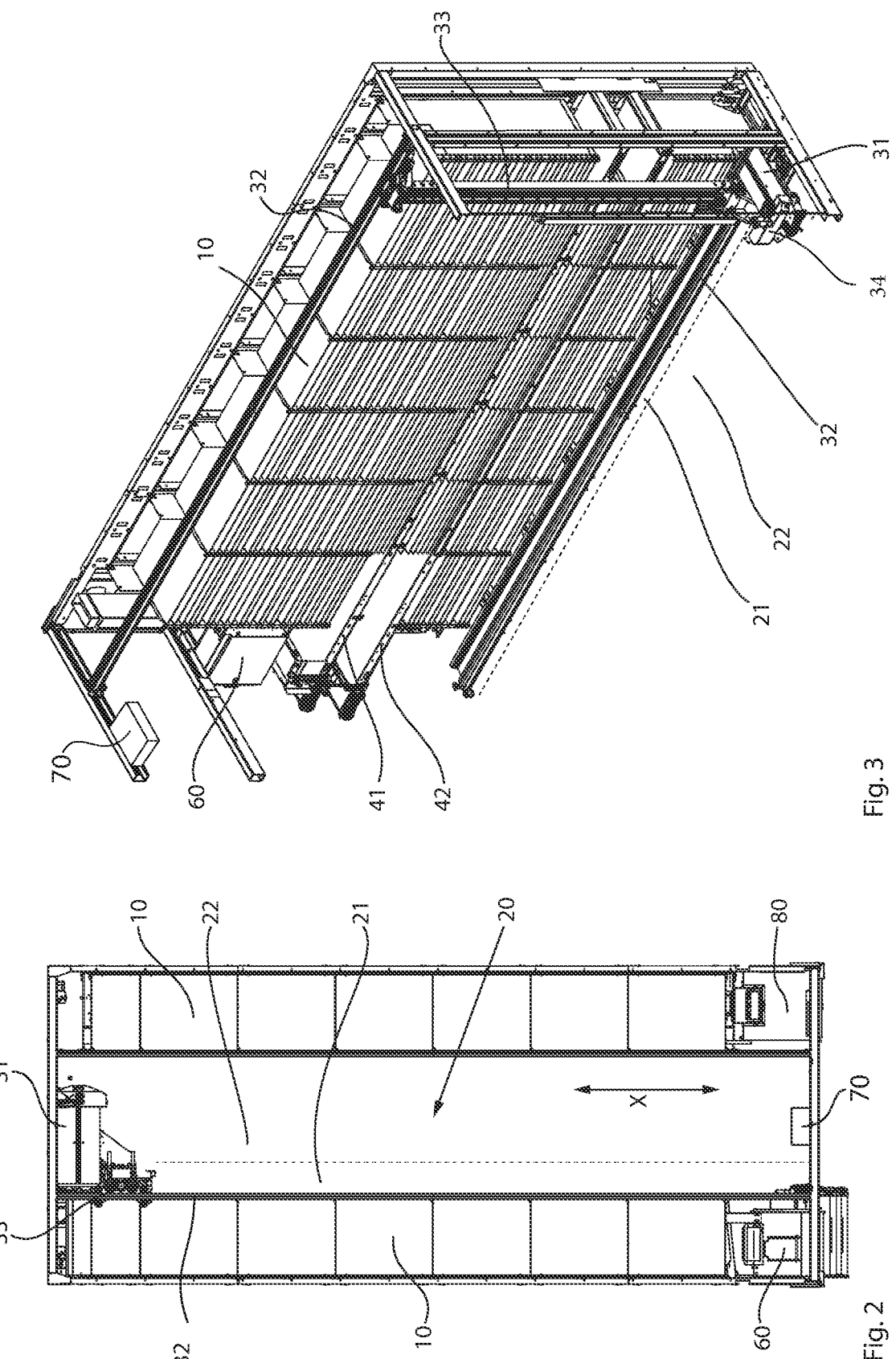
FIG. 2 is a top plan view of the picking device of FIGS. 1a and 1b.
FIG. 3 is a perspective sectional view of the picking device of FIGS. 1a and 1b in which a row of shelves is omitted.

FIG. 2 shows a top plan view of the picking device 1 according to the disclosure, wherein in this plan view in particular the movement space 20 formed between the rows of shelves for the operating device 30 can be seen. The movement space 20 is subdivided in FIG. 2 by means of a dashed line into a left movement space portion 21 and a right movement space portion 22. Due to the arrangement of the horizontal X-guide 32, the movement space portion 21 is a "critical" movement space portion, in which an obstacle in each case leads to a collision with an operating device 30 moved in the X-direction, due to the fact that the Z-guide 33 is always moved in the X direction in a movement in the X-direction. The movement space portion 22 is a "non-critical" movement space portion, since it is possible to drive around obstacles arranged in this movement space portion 22 of the movement space 20 by a corresponding movement of the gripper 31 of the operating device 30.

FIG. 3 shows a sectional view in which, in particular, the lower X-guide 32 of the operating device 30 can be seen. It can also be seen why the movement space portion 21 is defined as a "critical" movement area. Even if the gripper 31 is moved up to move an obstacle in the Z-direction, an obstacle in the critical movement space portion 21 causes a collision between the obstacle and the operating device 30 due to the movement of the Z-guide 33 in X-direction. On the gripper 31 of the operating device 30, an optical detection device 34 may also be provided, for example, a 2D or 3D camera, which is regularly necessary for the usual operation of the gripper 31. Moreover, in one or more embodiments, this optical detection device 34 may be used to capture an image of the movement space 20, as already described above.

Figure 5:
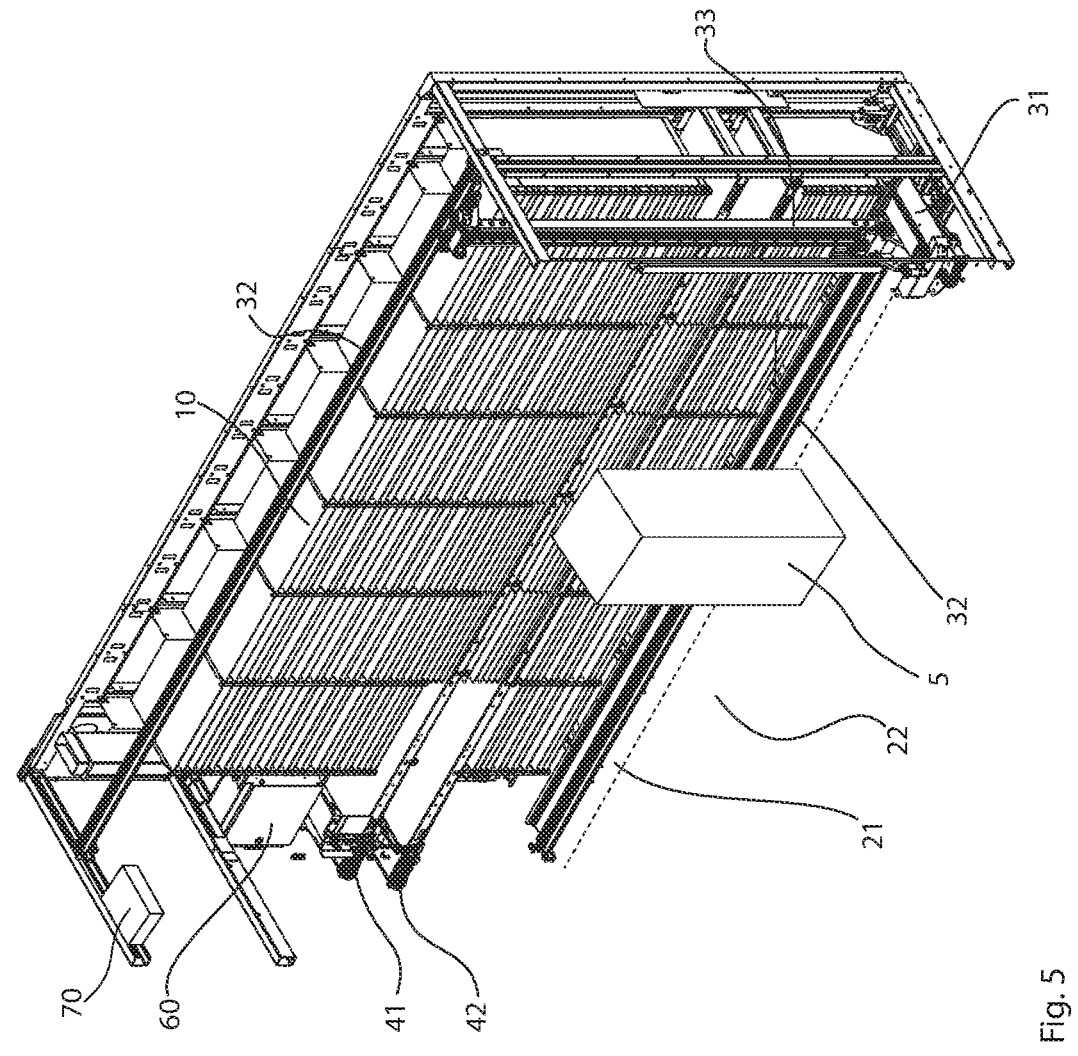
FIGS. 4 and 5 are top plan and perspective sectional views of the picking device of FIGS. 1a and 1b in which an obstacle is respectively arranged in the movement space of the picking device.
Figure 4:
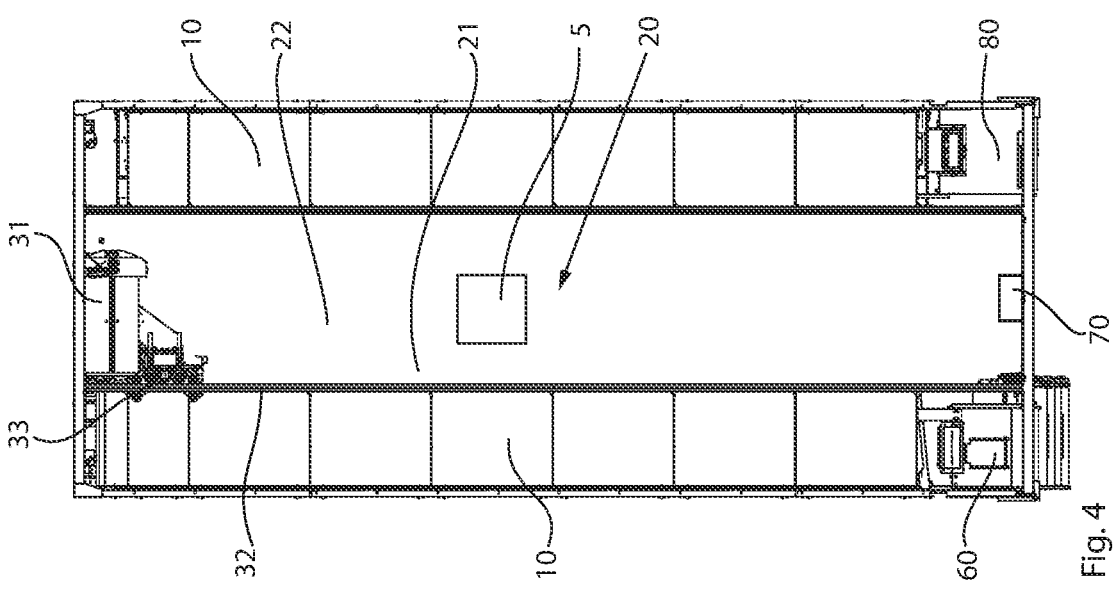

FIGS. 4 and 5 show the views of FIGS. 2 and 3 in which an obstacle 5 is disposed in the non-critical movement space portion 22. Due to the configuration of the operating device 30 with the arrangement of the X-guide 32 on one side of the movement space 20, it may be possible to drive around the obstacle with the operating device 30. Whether the obstacle is bypassed or whether a movement of the operating device 30 is generally inhibited upon determining an obstacle, on the one hand depends on whether the position and the size of the obstacle can be determined, and on the other hand on the specifications of the operator.

Figures 6A, 6B, 7A, 7B, 7C, 7D:
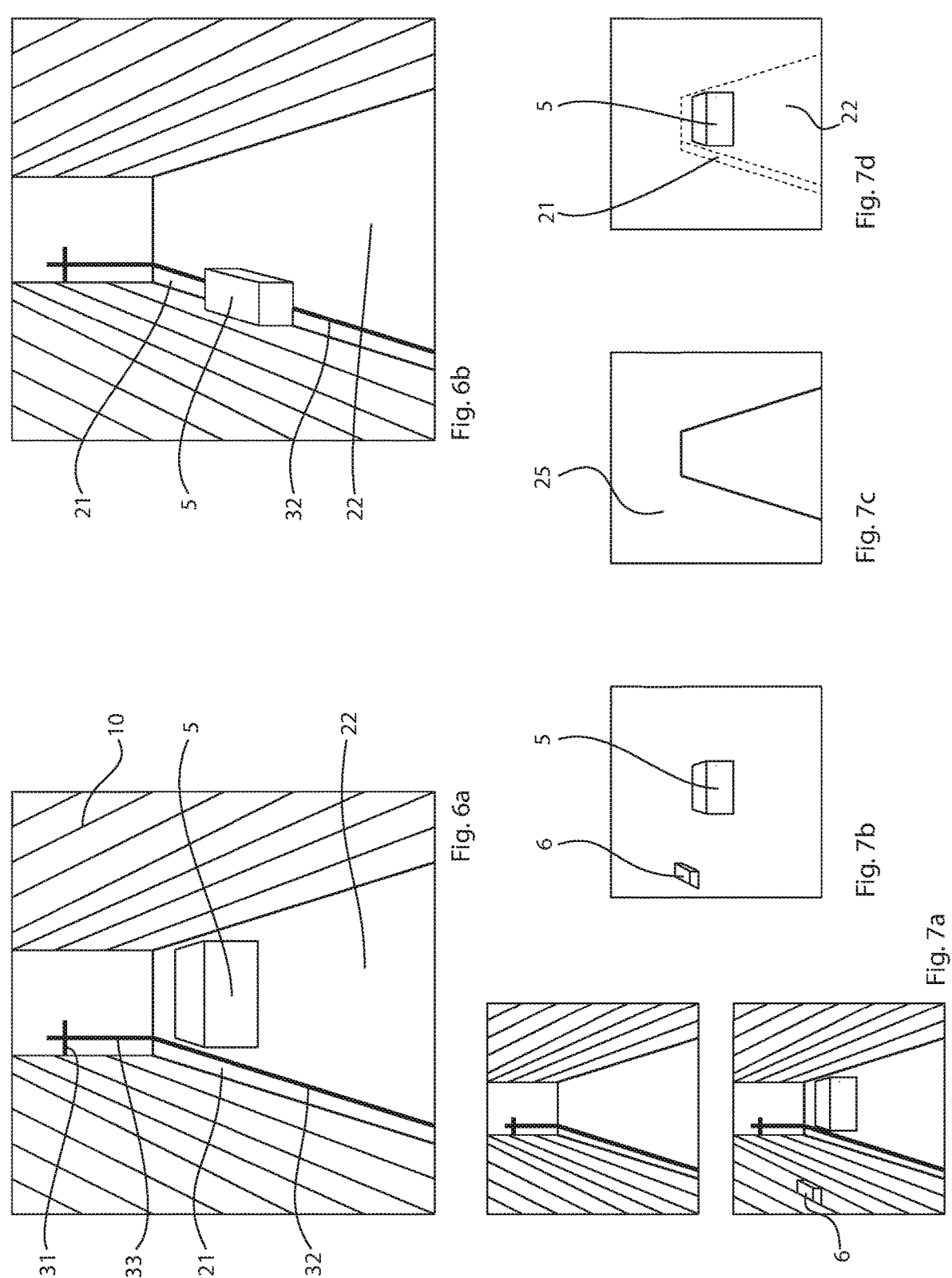

FIGS. 6a and 6b show schematically two images of the movement space 20 with differently arranged obstacles 5, wherein the images shown are each intended to represent the entire movement space 20. In the situation shown in FIG. 6a, an obstacle 5 is arranged in the "non-critical" movement space portion 22. As can be seen from the schematically illustrated X- and Z-guides 32, 33, it is possible in the situation shown in FIG. 6a that the operating device 30, with a corresponding orientation of the gripper 31, drives around the obstacle 5 without collision. However, a corresponding procedure is only possible if the exact position and size of the obstacle 5 can be determined, which depends at least in part on the size of the obstacle 5 itself and the contrast of obstacle/background. In the situation shown in FIG. 6b, in which the obstacle 5 obstructs the X-guide 32, the obstacle therefore being arranged in the critical movement space portion 21, a further operation of the picking device 1 is impossible, at least if the entire length of the picking device 1 extending in the X-direction should be used. If such a case is detected, intervention by an operator under the above-mentioned conditions is unavoidable.

One or more embodiments of the method according to the disclosure is described below with reference to FIGS. 7a-7d and FIG. 8, wherein FIGS. 7a-7d schematically illustrate the determination of an obstacle on the basis of an image and reference image. Also in this case, the entire range of movement of the image and the reference image is detected where the optical detection device 70 is located at the end side of the picking device 1 opposite the operating device 30. First, in step 100, in the presence of a predetermined event (e.g., a routine cleaning of the interior of the picking device) and in one or more embodiments, before the movement of the operating device 30 along the X-axis, an image of the movement space 20 is created with the optical detection device 70 (not shown). Two schematic views of such an image are shown in FIGS. 6a and 6b, wherein in FIG. 6a the obstacle is arranged in the non-critical movement space portion 22 and in FIG. 6b the obstacle is arranged in the critical movement space portion 21.

Subsequently, in step 110, predefined areas of the image of the movement space are compared with corresponding areas of a reference image. In FIG. 7a, a reference image is illustrated schematically in the upper portion for explaining the determination of an obstacle and, in the lower portion, an image recorded by the optical detection device 70 is illustrated schematically. Due to the geometry of the interior of the picking device 1, the image of the movement space 20 always includes not only the movement space 20 itself, but also portions of the two opposite rows of shelves 10, which are indicated schematically in FIG. 7a.

According to one or more embodiments, the procedure for determining an obstacle is as follows. First, the reference image and the current image are subtracted from each other such that only the objects remain that are present in the current image but not in the reference image. In the example shown in FIG. 7a, this is a medicament package 6 and an obstacle 5. The result of the difference formation is illustrated schematically in FIG. 7b.

Based on the comparison of the image and the reference image, it is then determined whether there is an obstacle in the movement space 20 in step 120. Since the image (as well as the reference image) always also includes areas which do not relate to the movement space 20 itself, but to parts of the lateral shelf storage, the result of the subtraction between image and reference image is combined with a mask 25 shown in FIG. 7c, which hides those areas of the result of difference formation that do not affect the movement space 20 itself. The result of this combination of the difference image with the mask is shown in FIG. 7d, where only the obstacle 5 remains, which is now processed using conventional known processing methods. For this purpose, the image indicated in FIG. 7d may be converted into a black and white image (e.g., binarized) and subjected to a subsequent blob analysis. All of those areas exceeding in size a certain predetermined size are then classified as an obstacle and, if possible and desired, their position and size are passed on to the control device 80. Depending on the exact procedure, any movement of the operating device 30 can be inhibited in the presence of an obstacle, alternatively, it is possible to specify driving around the obstacle, or with optimally positioned small obstacles, initiating a clearing away of the obstacles with the gripper 31 of the operating device 30.

Figure 8:
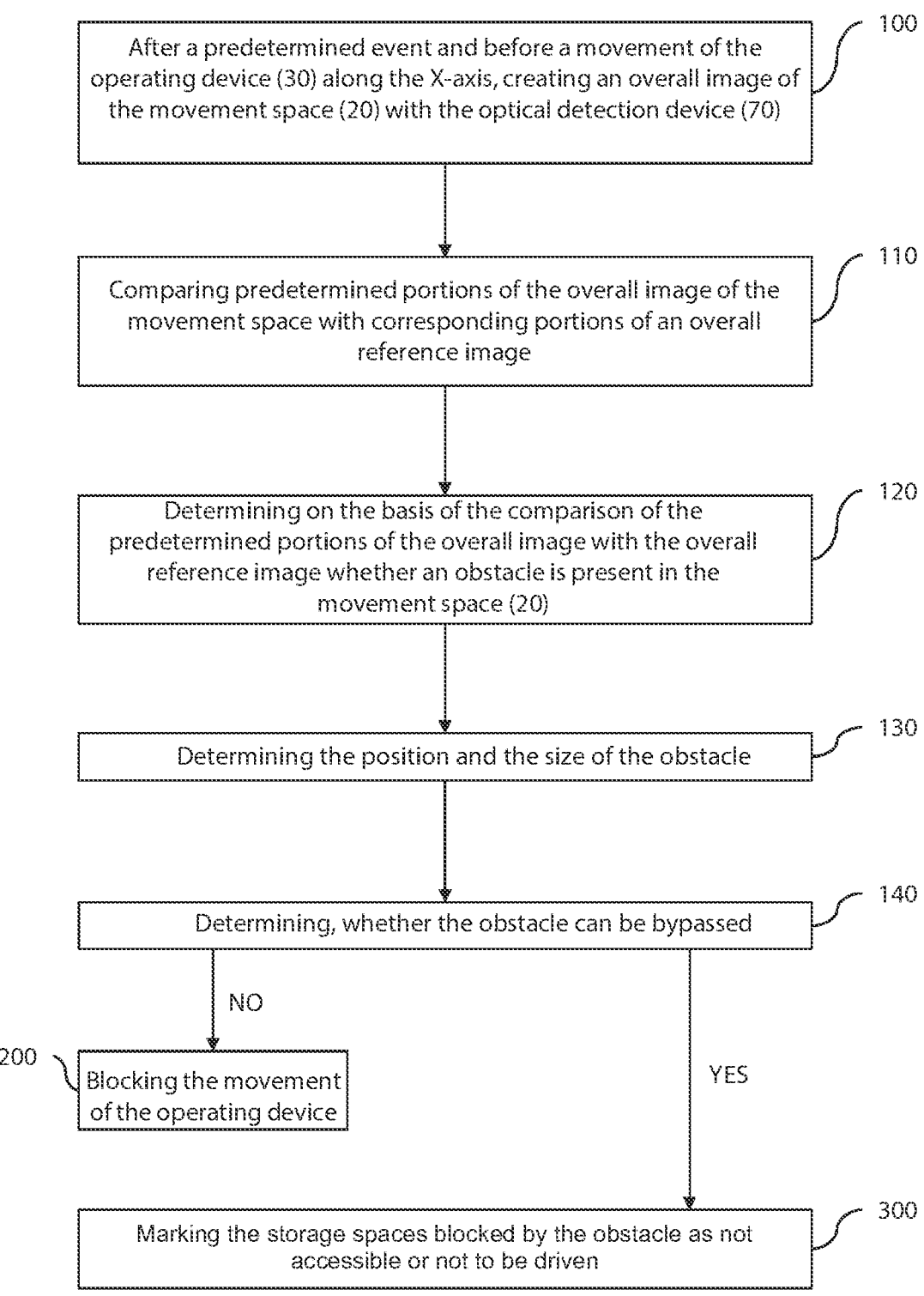
FIG. 8 illustrates a flow chart of one or more embodi-ments of a method according to the disclosure.

In the embodiment shown in FIG. 8, the size and the position of the obstacle are determined in step 130. For this purpose, it may be necessary to specify reference points in the picking device and/or to teach the control device 80 based on a plurality of overall reference images in relation to the determination of the size and the position. Alternatively or additionally, it can also be provided to equip the floor of the movement area 20 and/or the two movement space portions 21, 22 with special patterns and/or characteristic numbers. With the knowledge of the mounting location of the optical detection device 70, the size and position can then be determined in favorable circumstances.

Based on the knowledge of the size and the position of the obstacle, it is determined in step 140, based on the structural design of the movement space 20, whether the obstacle can be bypassed. If this is not the case, for example because the obstacle is arranged at least partially in the critical movement space portion 21, the operating device 30 is blocked, such that further movement is inhibited in step 200 until an operator indicates the removal of the obstacle.

If the bypassing is possible and intended, those storage spaces that cannot be reached due to the obstacle will be marked accordingly. For the further operation of the picking device 1 which then becomes possible after bypassing the obstacle, this means that the medicament packages stored at these storage spaces cannot be removed.

In one or more embodiments, it may be necessary to repeat the method described above for multiple portions of the picking device 1. For example, when the optical detection device 34 is arranged or used on the gripper 31 and when it is not possible to capture the entire movement space 20 with one image, or to compose the image of a plurality of partial images (e.g., if multiple optical detectors are used).

The present disclosure is provided to enable any person skilled in the art to practice the various aspects described herein. The disclosure provides various examples of the subject technology, and the subject technology is not limited to these examples. For example, any or all of the elements or components in this disclosure may by combined in different ways. Various modifications to these aspects will be readily apparent to those skilled in the art, and the generic principles defined herein may be applied to other aspects.

A reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject technology.

The word "exemplary" or the term "for example" is used herein to mean "serving as an example or illustration." Any aspect or design described herein as "exemplary" or "for example" is not necessarily to be construed as preferred or advantageous over other aspects or designs. In one aspect, various alternative configurations and operations described herein may be considered to be at least equivalent.

As used herein, the phrase "at least one of" preceding a series of items, with the term "or" to separate any of the items, modifies the list as a whole, rather than each item of the list. The phrase "at least one of" does not require selection of at least one item; rather, the phrase allows a meaning that includes at least one of any one of the items, and/or at least one of any combination of the items, and/or at least one of each of the items. By way of example, the phrase "at least one of A, B, or C" may refer to: only A, only B, or only C; or any combination of A, B, and C.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such a configuration may refer to one or more configurations and vice versa.

In one aspect, unless otherwise stated, all measurements, values, ratings, positions, magnitudes, sizes, and other specifications that are set forth in this specification, including in the claims that follow, are approximate, not exact. In one aspect, they are intended to have a reasonable range that is consistent with the functions to which they relate and with what is customary in the art to which they pertain.

It is understood that the specific order or hierarchy of steps, operations or processes disclosed is an illustration of exemplary approaches. Based upon design preferences, it is understood that the specific order or hierarchy of steps, operations or processes may be rearranged. Some of the steps, operations or processes may be performed simultaneously. Some or all of the steps, operations, or processes may be performed automatically, without the intervention of a user. The accompanying method claims, if any, present elements of the various steps, operations or processes in a sample order, and are not meant to be limited to the specific order or hierarchy presented.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for." Furthermore, to the extent that the term "include," "have," or the like is used, such term is intended to be inclusive in a manner similar to the term "comprise" as "comprise" is interpreted when employed as a transitional word in a claim.

The Title, Background, Summary, Brief Description of the Drawings and Abstract of the disclosure are hereby incorporated into the disclosure and are provided as illustrative examples of the disclosure, not as restrictive descriptions. It is submitted with the understanding that they will not be used to limit the scope or meaning of the claims. In addition, in the Detailed Description, it can be seen that the description provides illustrative examples and the various features are grouped together in various embodiments for the purpose of streamlining the disclosure. This method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the Detailed Description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirement of 35 U.S.C. § 101, 102, or 103, nor should they be interpreted in such a way.

What is claimed:

1. A system for handling medicament packages, comprising:

a picking device;

a movement space between parallel rows of multiple levels of shelves;

a horizontal guide disposed on only one side of the movement space along a bottom of one of the parallel rows of multiple levels of shelves;

a vertical guide disposed to move along the horizontal guide;

an optical detection device; and a control device, comprising:

a memory storing instructions; and at least one processor configured to execute the instructions to:

create an image of the movement space;

compare predefined areas of the image of the movement space with corresponding areas of a reference image;

determine that an obstacle is present in a detected portion of the movement space based on the image comparison;

provide corresponding signals for responding to the obstacle;

determine a storage area on one or more of the parallel rows of shelves is blocked by an obstacle based on a determined position and size of the obstacle;

mark one or more storage spaces of the determined storage area that are blocked by the obstacle as not accessible; and operate the picking device such that medicament packages stored at the marked one or more storage spaces cannot be removed when the obstacle is bypassed by an operating device within the picking device.

2. The system of claim 1, the at least one processor configured to execute the instructions to:

determine whether the obstacle can be bypassed by an operating device of the picking device based on the determined position and size of the obstacle.

3. The system of claim 1, the at least one processor configured to execute the instructions to:

determine whether the obstacle can be moved by an operating device of the picking device based on the determined position and size of the obstacle.

4. The system of claim 1, the at least one processor configured to execute the instructions to:

prevent movement of an operating device of the picking device based on the provided corresponding signals.

5. The system of claim 1, the at least one processor configured to execute the instructions to:

compose the image of the movement space and the reference image from a plurality of individual images.

6. The system of claim 1, the at least one processor configured to execute the instructions to:

compare the image of the movement space and the reference image based on partial images.

7. The system of claim 1, the at least one processor configured to execute the instructions to:

move an operating device horizontally in an X-direction and vertically in a Z-direction in the movement space.

8. The system of claim 1, the at least one processor configured to execute the instructions to:

create the image of the movement space after a predetermined event.

9. The system of claim 1, the at least one processor configured to execute the instructions to:

move, by a storage device, a medicament packaging into the picking device; and take, by an operating device, the medicament packaging from the storage device.

10. The system of claim 1, the at least one processor configured to execute the instructions to:

transfer, by an operating device, medicament packaging to an unloading device for removal from the picking device.

11. A non-transitory machine-readable storage medium comprising instructions thereon that, when executed by a machine, causes the machine to perform operations comprising:

creating an image of a movement space between parallel rows of multiple levels of shelves of a system having a picking device, a horizontal guide disposed on only one side of the movement space along a bottom of one of the parallel rows of multiple levels of shelves and a vertical guide moveably disposed on the horizontal guide;

comparing predefined areas of the image of the movement space with corresponding areas of a reference image;

determining that an obstacle is present in a detected portion of the movement space based on the image comparison;

providing corresponding signals for responding to the obstacle;

determining a storage area on one or more of the parallel rows of shelves is blocked by an obstacle based on a determined position and size of the obstacle;

marking one or more storage spaces of the determined storage area that are blocked by the obstacle as not accessible; and operating the picking device such that medicament packages stored at the marked one or more storage spaces cannot be removed when the obstacle is bypassed by an operating device within the picking device.

12. The non-transitory machine-readable storage medium of claim 11, the operations further comprising:

determining whether the obstacle can be one of bypassed and moved by an operating device of the picking device based on the determined position and size of the obstacle.

13. The non-transitory machine-readable storage medium of claim 11, the operations further comprising:

preventing movement of an operating device of the picking device based on the provided corresponding signals.

14. The system of claim 1, the at least one processor configured to execute the instructions to:

identify medicament packaging within the picking device.

* * * * *